United States Patent
Kanou

(10) Patent No.: US 8,339,332 B2
(45) Date of Patent: Dec. 25, 2012

(54) LAMINATED GLASS FOR VEHICLE

(75) Inventor: Tadahiko Kanou, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 349 days.

(21) Appl. No.: 12/599,849

(22) PCT Filed: May 19, 2008

(86) PCT No.: PCT/JP2008/059120
§ 371 (c)(1),
(2), (4) Date: Nov. 12, 2009

(87) PCT Pub. No.: WO2008/143209
PCT Pub. Date: Nov. 27, 2008

(65) Prior Publication Data
US 2010/0214194 A1  Aug. 26, 2010

(30) Foreign Application Priority Data

May 21, 2007 (JP) .................... 2007-134622

(51) Int. Cl.
*G09G 5/00* (2006.01)
(52) U.S. Cl. ........................... 345/7; 359/630
(58) Field of Classification Search ............... 345/7–9; 359/629–638
See application file for complete search history.

(56) References Cited

U.S. PATENT DOCUMENTS 6,979,499 B2 * 12/2005 Walck et al. ............ 428/690
7,230,767 B2 *  6/2007 Walck et al. ............ 359/630

FOREIGN PATENT DOCUMENTS

| JP | 8-171018 | 7/1996 |
| JP | 2006091172 | 4/2006 |

* cited by examiner

*Primary Examiner* — Seokyun Moon
(74) *Attorney, Agent, or Firm* — Rankin, Hill & Clark LLP

(57) ABSTRACT

In a windshield (11) of a vehicle equipped with a head up display formed from laminated glass, exterior glass (12), an intermediate layer (13), an image display layer (14) and interior glass (15) are laminated; since the image display layer (14) is interposed between the interior glass (15) and the intermediate layer (13) (or between the exterior glass 12 and the intermediate layer 13), and the thickness of the exterior glass (12) is made smaller than the thickness of the interior glass (15), a distance (T) from the image display layer (14) to the outer surface of the exterior glass (12) can be made small. It is therefore possible to reduce the displacement between a real image formed from light directly emitted toward a driver from an image (14*a*) on the image display layer (14) and a reflected image formed from light emitted from the image (14*a*) and reflected by the outer surface of the exterior glass (12), thus minimizing ghosting of the image and thereby enhancing visibility.

2 Claims, 5 Drawing Sheets

LAMINATED GLASS FOR VEHICLE

TECHNICAL FIELD

The present invention relates to laminated glass for a vehicle in which, when the laminated glass is disposed in the vehicle, an intermediate layer made of a resin is interposed between exterior glass on the outside of the vehicle and interior glass on the inside of the vehicle.

BACKGROUND ART

In general, with regard to laminated glass used as a windshield of a motor vehicle, etc., scattering of glass pieces when broken is prevented by compression bonding, between exterior glass on the outside of the vehicle and interior glass on the inside of the vehicle, an intermediate layer formed from a resin such as polyvinyl butyral or vinyl chloride.

Furthermore, a so-called head up display is known in which a variety of information is visibly displayed on a windshield so as to be provided to a driver. FIG. 5 shows one example of such a head up display; an image display section 02 formed from a half mirror (combiner) is provided on the surface of a windshield 01 on the inside of a vehicle, and an image 02a projected by an image projector 03 provided on a dashboard is reflected by the image display section 02 and imaged a few meters in front of the windshield 01, thereby enabling the image 02a to be viewed by the driver.

However, since the combiner is semi-transparent, when it is provided over a wide area of the windshield, the field of vision of the driver through the windshield is obstructed, and there is the problem that it is not possible to ensure a sufficiently large area for the combiner.

An arrangement in which a transparent light-emitting layer supporting phosphor particles is disposed on the interior of a windshield, and the layer is irradiated with ultraviolet light so as to excite the phosphor particles to make them emit light, thereby displaying an image on the light-emitting layer has been proposed. However, part of the light emitted forward from the image on the light-emitting layer is reflected from the surface of the windshield on the outside of the vehicle and reaches the eye of the driver. Because of this, a real image formed from light emitted directly from the image on the light-emitting layer and a reflected image of the image reflected from the surface of the windshield on the outside of the vehicle are visible to the driver one on top of another as shown in FIG. 3. In order to prevent this, the windshield 01 may be disposed perpendicular to the direction of the line of sight of the driver, but this is difficult for reasons of aerodynamics or design.

In the arrangement disclosed in Patent Publication 1 below, the thickness of a windshield having its upper side inclined rearward is changed so that the further toward the lower side the thinner it is, thus minimizing the displacement between a real image and a reflected image of an image on a light-emitting layer and thereby improving the visibility.

Patent Publication 1: Japanese Patent Application Laid-open No. 2-279437

DISCLOSURE OF INVENTION

Problems to be Solved by the Invention

However, in the arrangement disclosed in Patent Publication 1 above, since it is necessary to change the thickness of the windshield so that the further toward the lower side the thinner it is, not only is its production difficult thus causing an increase in cost, but there is also the problem that, when an attempt is made to ensure the strength of the glass required for the lower end of the windshield, the thickness of the glass in an upper part of the windshield increases greatly, thus increasing the weight.

The present invention has been accomplished in light of the above-mentioned circumstances, and it is an object thereof to minimize, by a simple structure, ghosting of an image projected on laminated glass.

Means for Solving the Problems

In order to attain the above object, according to a first aspect of the present invention, there is provided laminated glass for a vehicle in which, when the laminate glass is disposed in the vehicle, an intermediate layer made of a resin is interposed between exterior glass on the outside of the vehicle and interior glass on the inside of the vehicle, characterized in that an image display layer is interposed between the exterior glass and the intermediate layer or between the interior glass and the intermediate layer, and the thickness of the exterior glass is made smaller than the thickness of the interior glass.

According to a second aspect of the present invention, in addition to the first aspect, the image display layer is interposed between the interior glass and the intermediate layer.

According to a third aspect of the present invention, in addition to the first or second aspect, the image display layer is a transparent layer supporting a phosphor that emits light in response to excitation light projected by an image projector.

According to a fourth aspect of the present invention, there is provided laminated glass for a vehicle in which, when the laminate glass is disposed in the vehicle, an intermediate layer made of a resin is interposed between exterior glass on the outside of the vehicle and interior glass on the inside of the vehicle, characterized in that a phosphor that emits light in response to excitation light is supported on part or the whole of the intermediate layer, and the thickness of the exterior glass is made smaller than the thickness of the interior glass.

Effects of the Invention

In accordance with the first aspect of the present invention, since the image display layer is interposed between the intermediate layer and the exterior glass of the laminated glass for a vehicle, or between the interior glass and the intermediate layer, and the thickness of the exterior glass is made smaller than the thickness of the interior glass, the distance from the image display layer to the outer surface of the exterior glass becomes small. It is therefore possible to reduce the displacement between a real image formed from light directly emitted from an image displayed on the image display layer and a reflected image formed from light emitted from the image and reflected by the outer surface of the exterior glass, thus minimizing ghosting of the image while ensuring the strength of the laminated glass for a vehicle and thereby improving visibility.

Furthermore, in accordance with the second aspect of the present invention, since the image display layer is interposed between the interior glass and the intermediate layer, light projected on the image display layer from the interior of a vehicle compartment or light emitted toward a driver from an image displayed on the image display layer does not pass through the intermediate layer, and it is possible to minimize attenuation in the intermediate layer and enable a clear image to be viewed. Moreover, since external light entering from outside the vehicle reaches the image display layer in an attenuated state after passing through the intermediate layer, an image displayed on the image display layer can be more clearly viewed. Furthermore, ultraviolet rays from outside the vehicle are blocked by the intermediate layer to thus prevent the image display layer from being irradiated, and when ultraviolet rays are applied from the interior of the vehicle as excitation light, the ultraviolet rays can be blocked by the intermediate layer to thus prevent them from passing through to the exterior of the vehicle.

Moreover, in accordance with the third aspect of the present invention, since the image display layer is formed from a transparent layer supporting a phosphor that emits light in response to excitation light projected from the image projector, and not only is it possible to save space since the image projector can be formed simply compared with a conventional combiner method, but also the field of forward vision through the windshield can be made clear compared with one in which the image display layer is formed from a conventional combiner having low transparency.

Furthermore, in accordance with the fourth aspect of the present invention, since the phosphor that emits light in response to excitation light is supported on the intermediate layer made of a resin interposed between the exterior glass and the interior glass of the laminated glass for a vehicle, and the thickness of the exterior glass is made smaller than the thickness of the interior glass, the distance from the intermediate layer to the outer surface of the exterior glass becomes small. It is therefore possible to reduce the displacement between a real image formed from light directly emitted from an image displayed on the intermediate layer by excitation light and a reflected image formed from light emitted from the image and reflected by the outer surface of the exterior glass, thus minimizing ghosting of the image while ensuring the strength of the laminated glass for a vehicle and thereby improving visibility.

EXPLANATION OF REFERENCE NUMERALS AND SYMBOLS

12 Exterior glass
13 Intermediate layer
14 Image display layer
15 Interior glass
16 Image projector

BEST MODE FOR CARRYING OUT THE INVENTION

Modes for carrying out the present invention are explained below by reference to the attached drawings.

Figure 1:
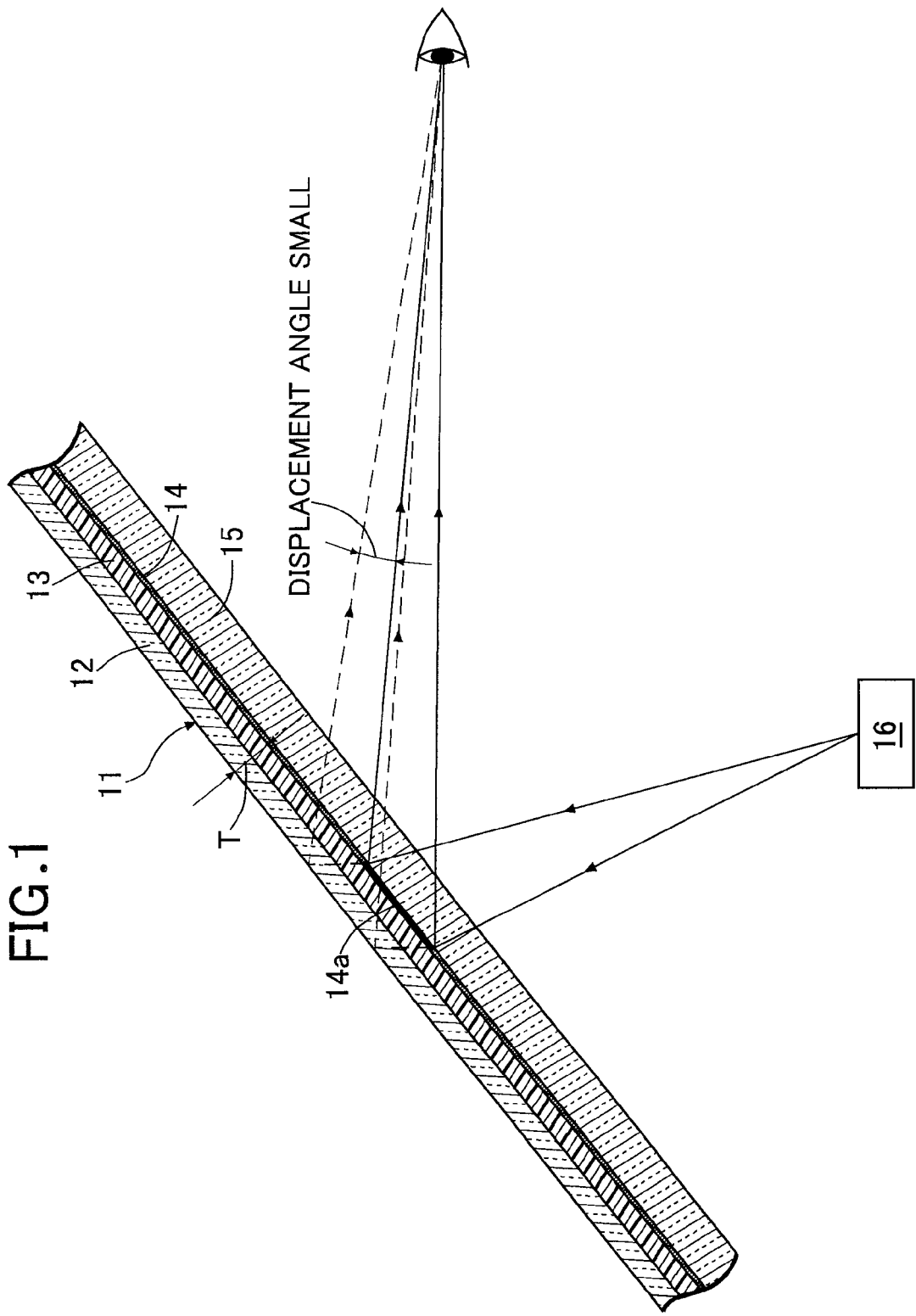
FIG. 1 is a sectional view of a windshield of a motor vehicle equipped with a head up display related to a first embodiment.
Figure 2:
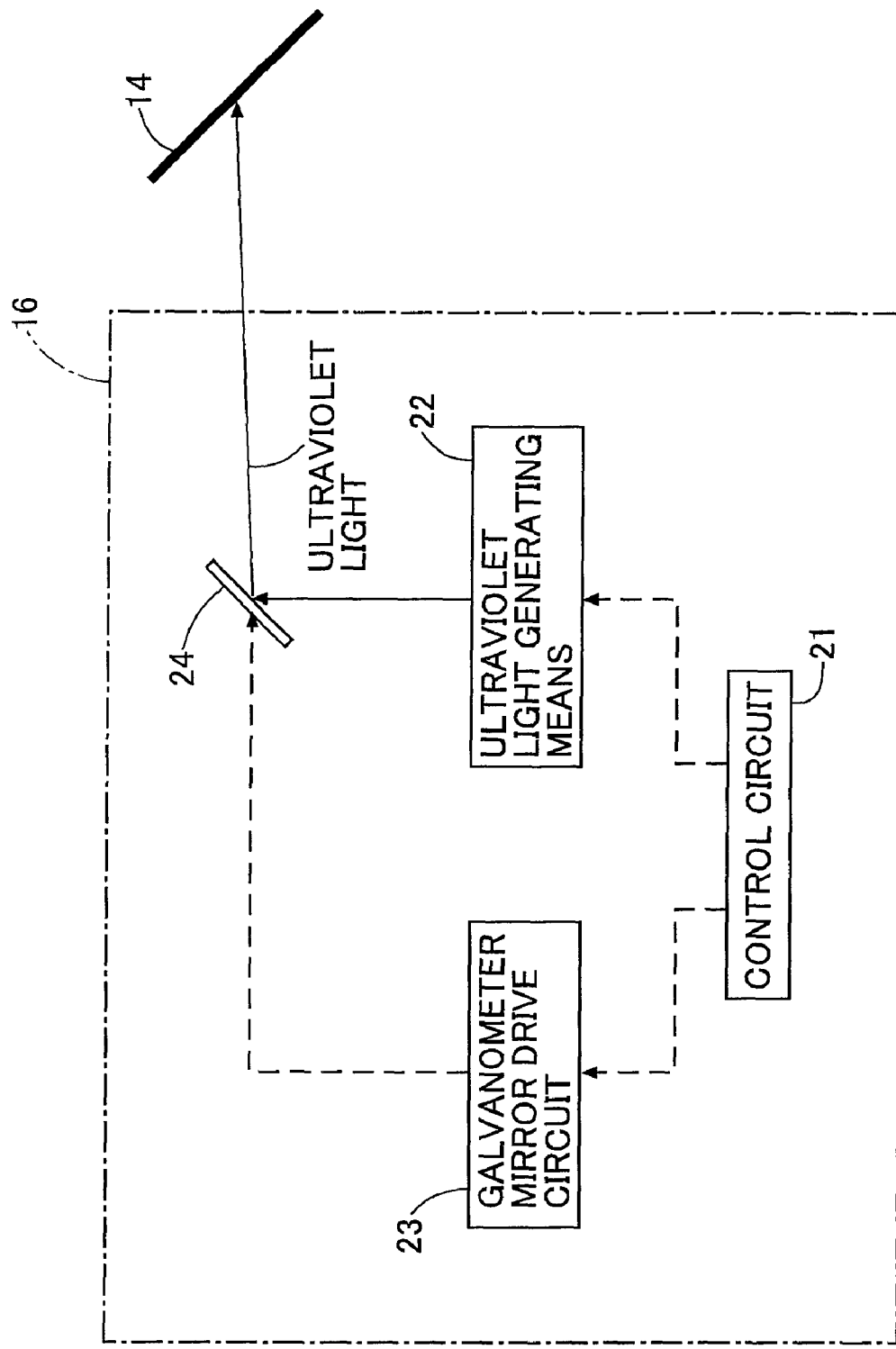
FIG. 2 is a block diagram showing the arrangement of an image projector.
Figure 3:
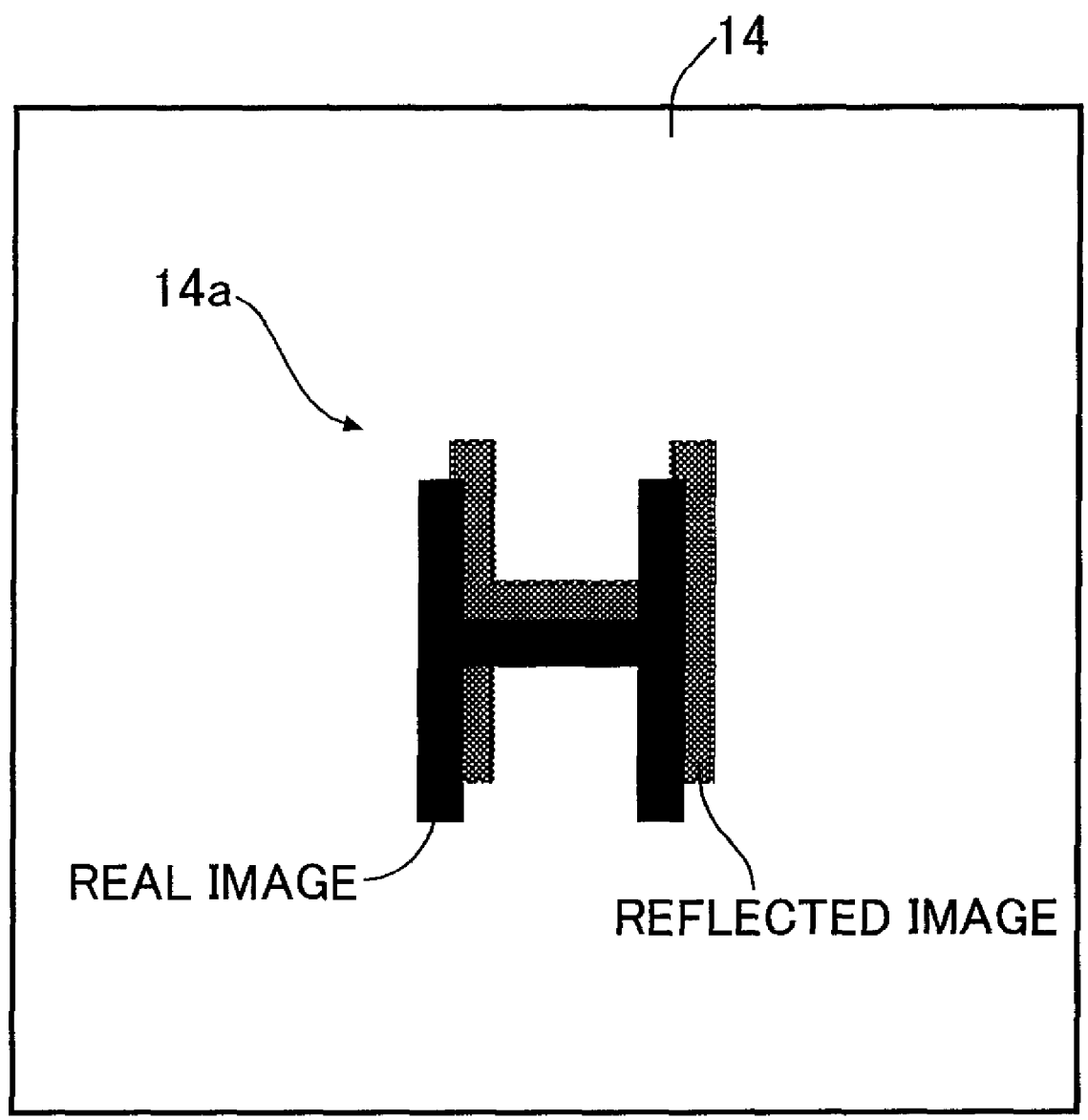
FIG. 3 is a diagram showing an image with ghosting.

FIG. 1 to FIG. 3 show a first embodiment of the present invention.

As shown in FIG. 1, a windshield 11 of a motor vehicle formed from laminated glass is formed by laminating four layers, that is, from the outside of the vehicle to the inside of the vehicle, exterior glass 12, an intermediate layer 13 formed from a resin such as polyvinyl butyral or vinyl chloride, an image display layer 14 formed from a transparent film supporting a nanoparticle phosphor, and interior glass 15. The thickness of the exterior glass 12 is, for example, 1.5 mm, the thickness of the intermediate layer 13 is, for example, 0.8 mm, the thickness of the image display layer 14 is, for example, 100 μm, and the thickness of the interior glass 15 is, for example, 2.5 mm. It is important here that the thickness of the exterior glass 12 is smaller than the thickness of the interior glass 15.

The intermediate layer 13 has the function of preventing scattering of pieces of the exterior glass 12 and the interior glass 15 when the windshield 11 is broken as well as an effect in blocking ultraviolet rays. Furthermore, the image display layer 14 forms an image that is visible to a driver as a result of the nanoparticle phosphor supported thereon being excited by ultraviolet light projected by an image projector 16 and emitting light.

As shown in FIG. 2, the image projector 16 is formed from a control circuit 21, ultraviolet light generating means 22, a galvanometer mirror drive circuit 23, and a galvanometer mirror 24. The ultraviolet light generating means 22, which is connected to the control circuit 21, transmits ultraviolet light for forming a predetermined image that is displayed on a head up display, and the galvanometer mirror 24, which is operated by the galvanometer mirror drive circuit 23 connected to the control circuit 21, reflects the ultraviolet light and scans in a vertical direction and a horizontal direction. As a result, the nanoparticle phosphor of the image display layer 14 that the ultraviolet light strikes is excited and thus emits light, thereby forming the predetermined image on the image display layer 14. The image formed on the image display layer 14 is viewed by the driver while being superimposed on the landscape.

Light that is emitted from an image 14a (see FIG. 1) of the image display layer 14 toward the inside of the vehicle enters the eye of the driver through the interior glass 15, whereas light that is emitted from the image 14a toward the outside of the vehicle passes through the intermediate layer 13 and the exterior glass 12, is reflected by the outer surface of the exterior glass 12, further passes through the exterior glass 12, the intermediate layer 13, the image display layer 14, and the interior glass 15, and then enters the eye of the driver. In this process, since light (see the solid line) that enters the eye of the driver directly from the image 14a and light (see the broken line) that indirectly enters the eye of the driver after being reflected by the outer surface of the exterior glass 12 are displaced, as shown in FIG. 3 the driver views an image in which the real image and the reflected image are partially overlapped.

The amount of displacement between the real image and the reflected image is proportional to a distance T between the image display layer 14 and the outer surface of the exterior glass 12, and in this embodiment since the total thickness of the exterior glass 12 and the interior glass 15 is at least a predetermined thickness and the exterior glass 12 is made thinner than the interior glass 15, compared with a case in which the exterior glass 12 and the interior glass 15 have identical thicknesses, it is possible to reduce the amount of displacement between the real image and the reflected image by making the distance T small, thereby enhancing the visibility of the image 14a while maintaining the strength of the glass.

Furthermore, since the image display layer 14 is disposed between the intermediate layer 13 and the interior glass 15, ultraviolet light projected on the image display layer 14 from the image projector 16 or light emitted from the image 14a toward the driver does not pass through the intermediate layer 13, thus preventing degradation of the visibility of the image 14a due to attenuation in the intermediate layer 13 and, moreover, since ultraviolet rays contained in external light entering from the outside of the vehicle can be cut substantially, it is possible to prevent the entire image display layer 14 dimly emitting light, thereby enabling an image displayed on the image display layer 14 to be more clearly visible.

Furthermore, since the image display layer 14 is formed from a transparent film supporting a nanoparticle phosphor that emits light in response to ultraviolet light projected by the image projector 16, not only is it possible to form the image projector 16 simply and save space compared with a conventional combiner method, but it is also possible to make the field of forward vision through the windshield 11 clear compared with one in which the image display layer 14 is formed from a semi-transparent half mirror.

Moreover, since the intermediate layer 13, which is disposed on the outside of the image display layer 14, has the function of blocking ultraviolet rays, it is possible to block ultraviolet rays from the exterior of the vehicle by means of the intermediate layer 13 and prevent them reaching the image display layer 14 and, moreover, ultraviolet light projected by the image projector 16 can be blocked by the intermediate layer 13 and prevented from passing through to the exterior of the vehicle.

A mode for carrying out the present invention is explained above, but the present invention may be modified in a variety of ways as long as the modifications do not depart from the spirit and scope thereof.

Figure 4:
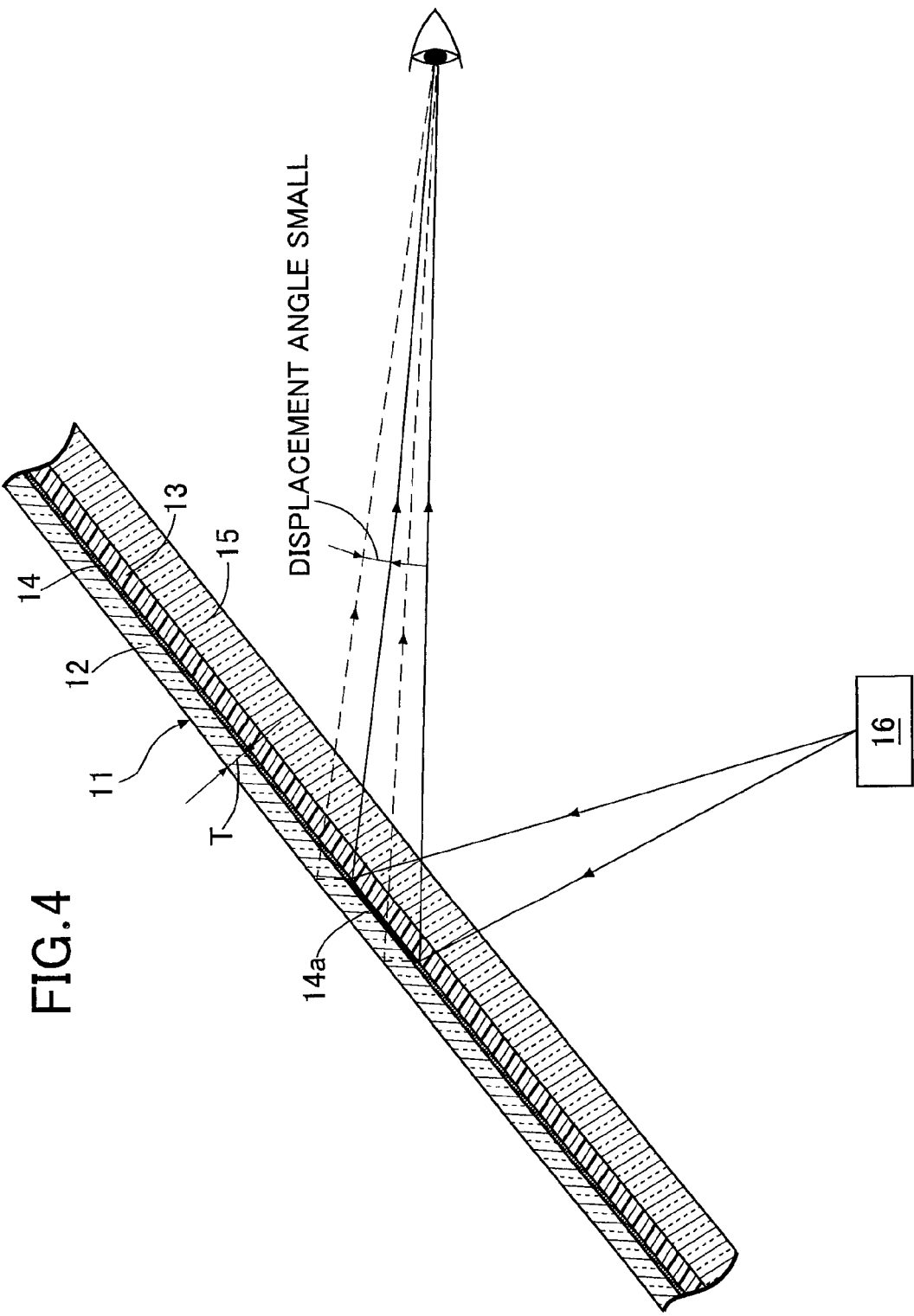
FIG. 4 is a view, corresponding to FIG. 1 above, related to a second embodiment.
Figure 5:
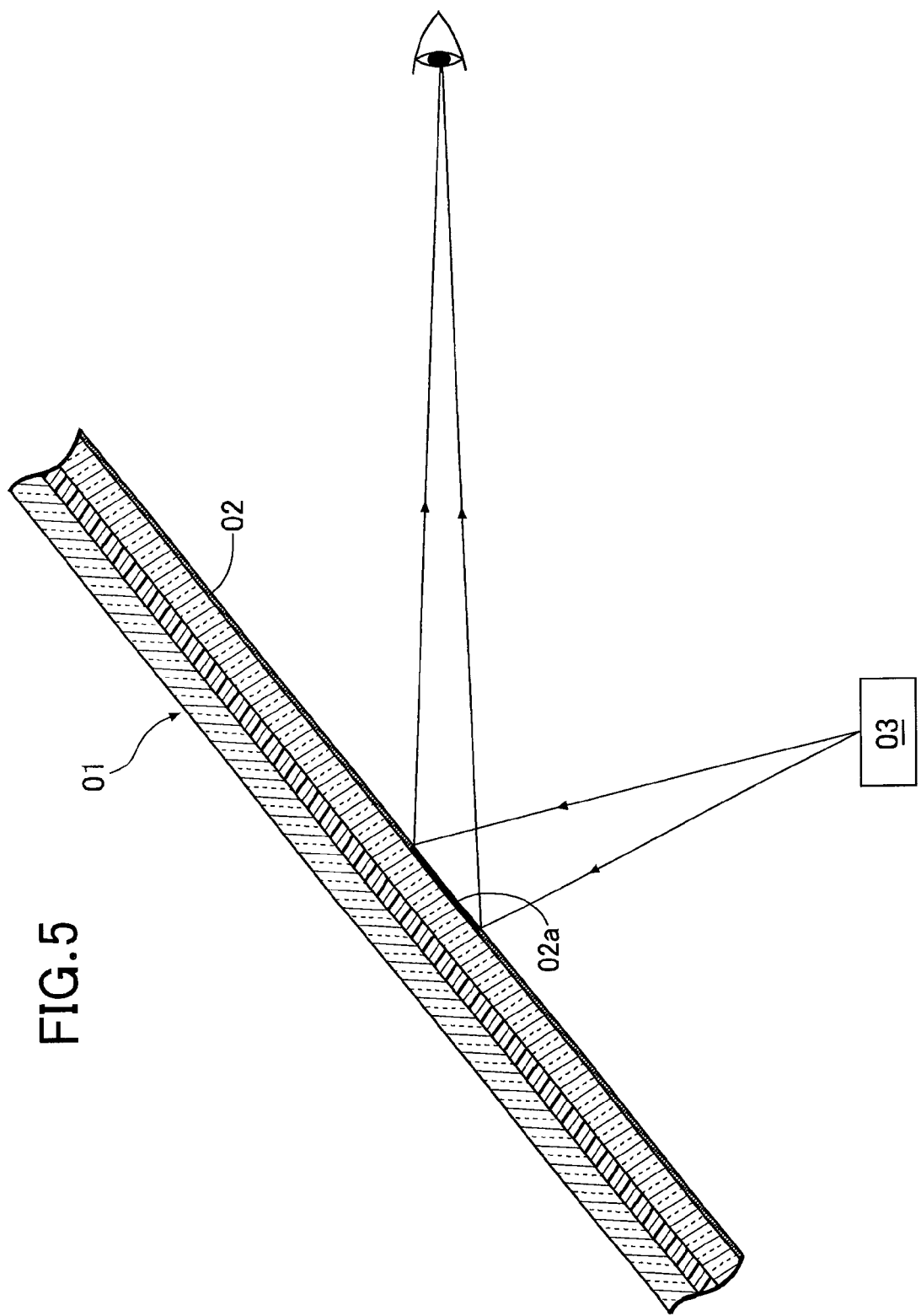
FIG. 5 is a view, corresponding to FIG. 1 above, related to a conventional example.

For example, in this embodiment the image display layer 14 is disposed between the intermediate layer 13 and the interior glass 15, but as shown in a second embodiment of FIG. 4, an image display layer 14 may be disposed between an intermediate layer 13 and exterior glass 12. In order to make the distance T between the image display layer 14 and the outer surface of the exterior glass 12 small, it is better to dispose the image display layer 14 between the intermediate layer 13 and the exterior glass 12, but by so doing light emitted rearward from the image 14a passes through the intermediate layer 13 and enters the eye of the driver, the visibility of the image 14a is degraded due to attenuation in the intermediate layer 13, and when ultraviolet rays are used as excitation light, it can be expected that the excitation light projected by the image projector 16 will be absorbed by the intermediate layer 13 and the luminance of a displayed image will be decreased.

Furthermore, in the embodiment, the image 14a is formed by projecting ultraviolet light onto the image display layer 14, which is formed from a transparent film supporting a nanoparticle phosphor, but an image 14a may be formed by projecting IR laser light onto an image display layer 14 formed from a transparent film supporting photosensitive fine glass particles.

Moreover, in the embodiment an image is displayed on the image display layer 14, but as in the invention according to Claim 4, the image display layer 14 may be omitted, and an image may be displayed on an intermediate layer 13 supporting a nanoparticle phosphor. In this case, needless to say the thickness of the exterior glass 12 is made smaller than the thickness of the interior glass 15.

Furthermore, an image display layer 14 may be formed from a half mirror (combiner), and part of an image projected by an image projector 16 may be reflected toward the driver side by the image display layer 14. In this case, since the half mirror is semi-transparent, a forward landscape viewed through the half mirror becomes somewhat indistinct.

Moreover, the thicknesses of the exterior glass 12, the intermediate layer 13, the image display layer 14, and the interior glass 15 shown in the embodiment are examples, and are not limited thereto.

The invention claimed is:

1. Laminated glass for a vehicle in which, when the laminate glass is disposed in the vehicle, an intermediate layer made of a resin is interposed between exterior glass on an outside of the vehicle and interior glass on an inside of the vehicle,
    wherein an image display layer is interposed between the the interior glass and the intermediate layer, and a thickness of the exterior glass is made smaller than a thickness of the interior glass
    wherein the image display layer is a transparent layer supporting a phosphor that emits light in response to excitation light projected by an image projector which is to be provided inside the vehicle, and
    wherein a distance between the image display layer and an outer surface of the exterior glass is made smaller than the thickness of the interior glass.

2. The laminated glass for a vehicle according to claim 1, wherein the excitation light is ultraviolet light and the intermediate layer serves to block ultraviolet rays.

* * * * *